INVENTOR.
EDGAR A. HIRZEL

2,917,135

BRAKE HAVING AUTOMATIC TORQUE CONTROLLING MEANS

Edgar A. Hirzel, Cuyahoga Falls, Ohio, assignor to The Goodyear Tire & Rubber Company, Akron, Ohio, a corporation of Ohio Application January 11, 1957, Serial No. 633,662

1 Claim. (Cl. 188—181)

This invention relates to brakes and is especially useful in the construction of disc type brakes in which a rotatable disc is carried by a wheel so as to pass a relatively non-rotatable friction member having a cylinder with a movable piston for supporting a brake lining for frictional engagement with the disc.

It is an object of this invention to so mount the non-rotatable friction member of the brake that excessive torque will cause the non-rotatable member to move to a position where its radius of application or its area of application will be reduced to reduce the torque correspondingly.

Other objects are to provide uniform braking, to prevent excessive braking and to provide smoothness of brake application.

These and other objects will appear from the following description and the accompanying drawings.

Figure 1:
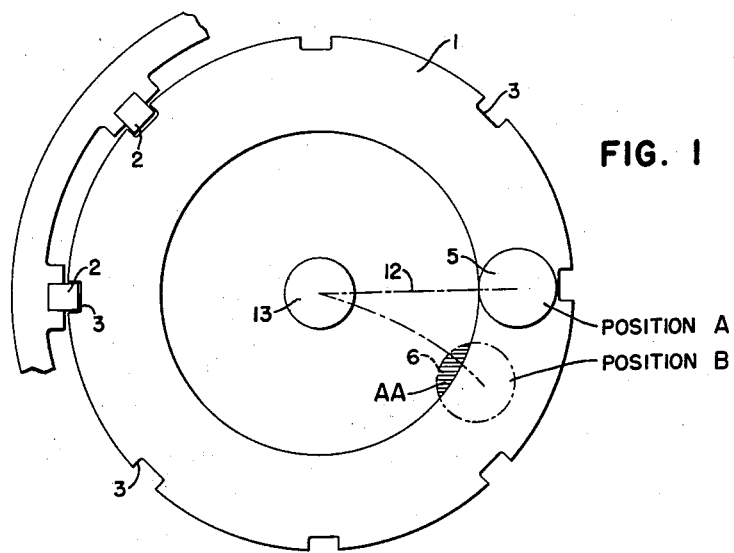
Fig. 1 is a diagram showing a fixed axle, a brake disc rotatable thereabout and two positions of a brake shoe supported for swinging movement as by a cantilever spring.
Figure 2:
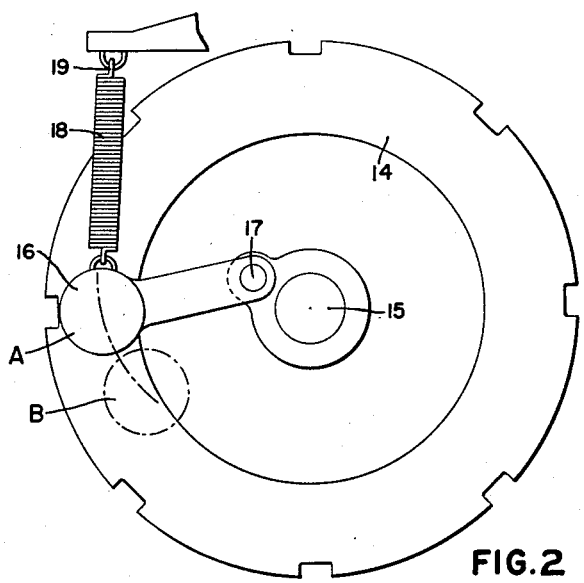
Fig. 2 is a diagram showing a brake disc and a friction member supported by a lever and coil spring.

Referring to the drawings, and first to Fig. 1, the numeral 1 designates a rotatable brake disc which may be supported by a landing wheel of an airplane or by other rotating means having keys 2 for engaging notches 3 in the periphery of the disc whereby the disc is free to float axially. A brake support 4 of generally C-shape as seen in Fig. 2 has a movable brake shoe 5 and a fixed brake shoe 6 opposite thereto, the shoe 5 being mounted on a piston 7 fitted in a cylinder 8 formed in the support. A hydraulic pressure connection 9 on the cylinder connects to a flexible tube 10 whereby it may be connected to a source of fluid pressure. The arrangement is such that when fluid pressure is applied to cylinder 8, piston 7 is moved toward disc 1 and clamps the disc between shoes 5 and 6, the disc being free to float axially to center it between the shoes.

A coil spring 11 is provided in the cylinder 8 to return the piston 7 when fluid pressure is released.

To provide for supporting the brake support 4 in a manner to automatically control torque, the support may be mounted upon a cantilever spring 12 as shown in Fig. 1, from a stationary frame member 13. Assuming that the brake shoe is normally at position A in Fig. 1 and that the cantilever spring is fixed to the axle with the disc 1 rotating in the direction shown, then application of braking pressure would provide a torque force against spring 12 causing it to be deflected in the direction of rotation. With bending of the spring, the radial position of the shoes 5 and 6 relative to the disc 1 would be moved inwardly of the disc and in the example shown in Fig. 1, the area of brake contact would be reduced by such radial shortening due to the shoes moving inwardly to overlie the inner periphery of the disc by the amount of the shaded area AA in position B. Such reduction in area of contact and in radius of application results in a reduction of torque and acts to maintain uniform torque of the brake.

Referring to Fig. 4, the brake disc 14 is rotatably mounted about a center 15. The brake support 16 is pivotally mounted at 17 on a fixed support for swinging movement from a position A with no braking load applied where its face is fully covered by the brake disc, to a position B where the shoe is only partially covered by the brake disc. The brake support is held at position A by a tension coil spring 18 the upper end 19 of which is secured to a fixed support. With this arrangement, when the brake is applied, the tension in the spring 18 is increased to balance the torque and the brake support is moved about its support 17 pivotally toward position B. The radius of the brake shoe from the center 15 is reduced by such movement and the area of contact of the brake shoes is also reduced.

As the torque is a function of the radius of brake application and also a function of area of the brake contacting force, a reduction of both of these will reduce torque and stabilizing braking.

While certain representative embodiments and details have been shown for the purpose of illustrating the invention, it will be apparent to those skilled in this art that various changes and modifications may be made without departing from the spirit or scope of the invention.

I claim:

A brake construction preventing excessive torque and including in combination, a rotatable disc having a hollow center, a spot-type hydraulic brake means having a pair of substantially circular brake shoes adapted to clamp on opposite sides of the disc in a direction perpendicular thereto, a fixed support near the axis of rotation of the disc, arm means extending between the support and the brake means substantially in the plane of the disc and resiliently yielding in the direction of rotation of the disc to progresisvely swing the brake shoes off the inner edge of the disc in a direction parallel to the disc and progressively reduce the radial distance between the brake means and the support, and means for supplying hydraulic pressure to the brake means.

References Cited in the file of this patent

UNITED STATES PATENTS

| | | |
|---|---|---|
| 2,050,902 | Tatter | Aug. 11, 1936 |
| 2,065,382 | Levy | Dec. 22, 1936 |
| 2,485,086 | Cagle | Oct. 18, 1949 |
| 2,751,046 | Tack | June 19, 1956 |
| 2,789,666 | Burnett | Apr. 23, 1957 |

FOREIGN PATENTS

| | | |
|---|---|---|
| 451,415 | Great Britain | July 31, 1936 |